M. G. McGUIRE.
AIR COMPRESSOR AND DISTRIBUTER.
APPLICATION FILED AUG. 15, 1910.
1,002,295.
Patented Sept. 5, 1911.
2 SHEETS—SHEET 2.
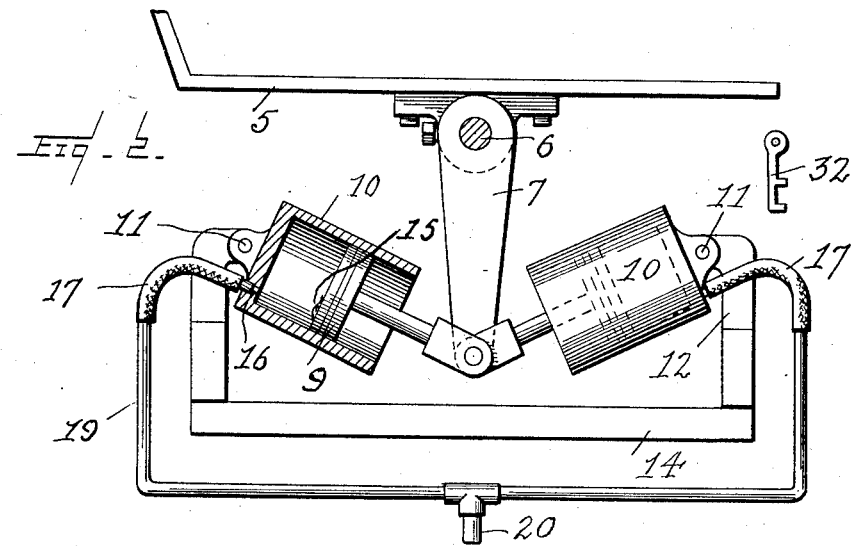
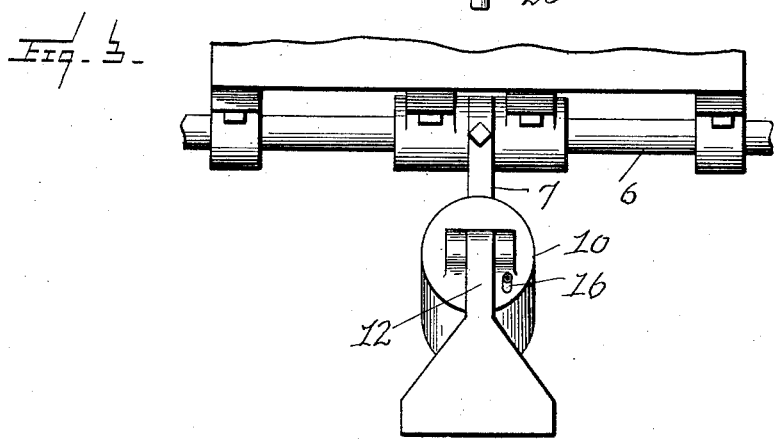
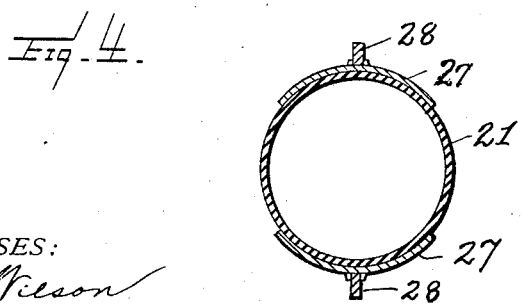
WITNESSES:
INVENTOR
M. G. McGuire
BY
Nicholas L. Bogan
Attorney

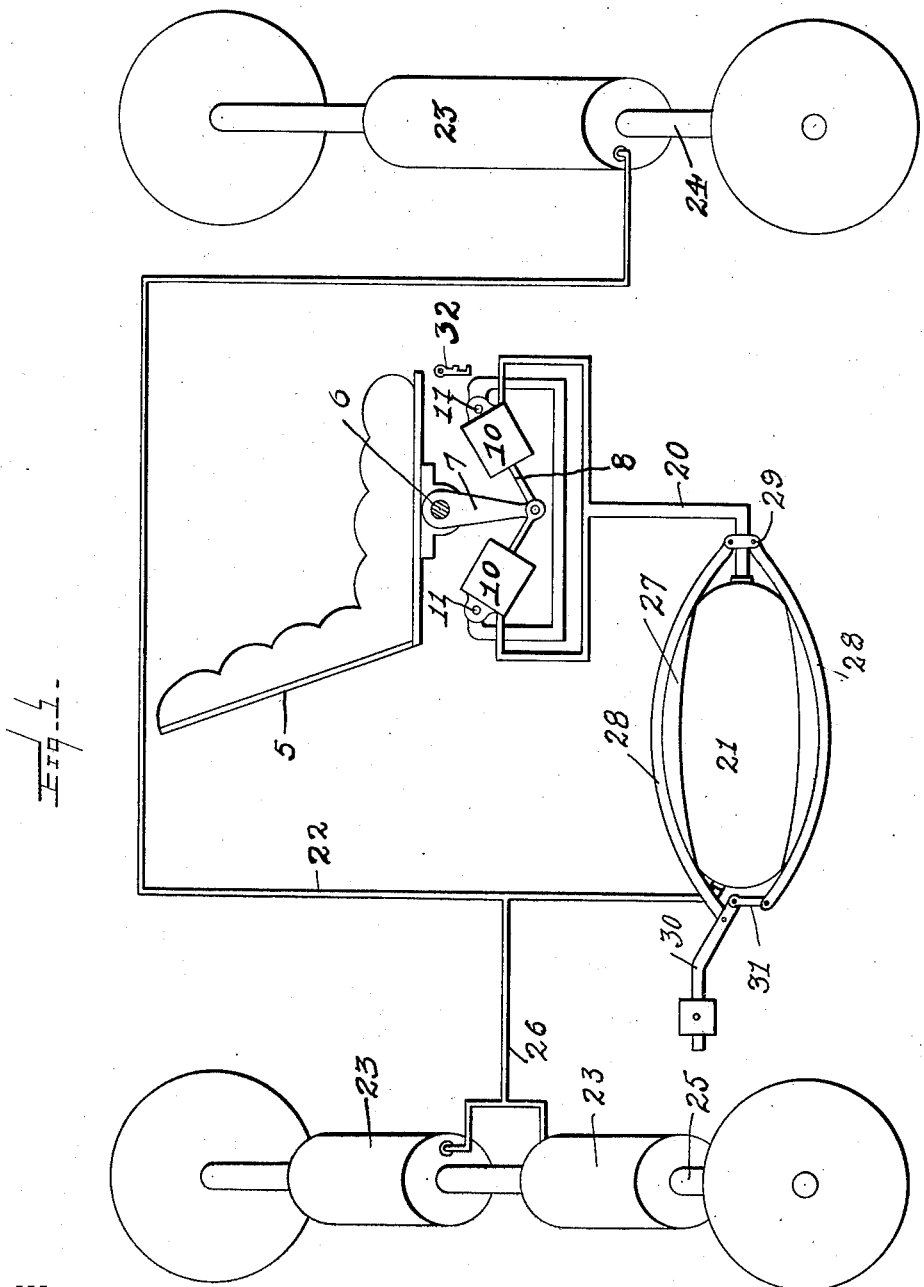

UNITED STATES PATENT OFFICE.

MICHAEL G. McGUIRE, OF CHICAGO, ILLINOIS.

AIR COMPRESSOR AND DISTRIBUTER.

1,002,295. Specification of Letters Patent. Patented Sept. 5, 1911.

Application filed August 15, 1910. Serial No. 577,223.

*To all whom it may concern:*

Be it known that I, MICHAEL G. McGUIRE, a citizen of the United States of America, residing at Chicago, in the county of Cook and State of Illinois, have invented certain new and useful Improvements in Air Compressors and Distributers, of which the following is a specification.

This invention relates to certain new and useful improvements in air compressors and distributers, and has for its primary object to provide means for the compressing, storing and feeding of air to a pneumatic cushioning element in which it is desired to maintain a maximum air pressure.

A further object of the invention is to provide rocking means operated by the weight of a person and particularly adapted for use in connection with automobiles and like vehicles, whereby the operator may, without leaving his seat, actuate compressing means for forcing air into a storage tank or reservoir which is in communication with the cushioning element or elements to be maintained in inflated condition, and which storage tank or reservoir is so constructed as to regulate and control the flow of air to the cushioning element or elements.

As the device has been designed for use in connection with improved cushioning means for vehicles, which cushioning device forms the subject matter of a separate application for Letters Patent, the illustration of the device herein made, and the description thereof, is given in connection with an automobile, though I wish to be distinctly understood as disclaiming any intention to limit myself to the use of my improved air compressing, storing, and feeding means in connection with the specific application thereof as herein shown and described.

Briefly described, the invention comprises in connection with an operating-element, such for instance as a seat of an automobile body, means for compressing air by the actuation of the seat for inflating a cushioning element or elements and for storing a quantity of compressed air above that required for inflating said element or elements to be fed thereto to maintain a maximum amount of air in the cushioning element or elements.

In describing the invention in detail, reference will be had to the accompanying drawings forming a part of this application, and wherein like numerals of reference will be employed to indicate like parts throughout the different views of the drawings, in which:—

Figure 1, is a diagrammatical view illustrating an embodiment of my invention applied to a vehicle body for supplying compressed air to pneumatic cushioning elements surrounding the axles of the vehicle, Fig. 2, is a detail side elevation and sectional view of the air-compressing means, Fig. 3, is a rear elevation thereof, and Fig. 4, is a transverse vertical sectional view of the storage tank or reservoir.

The invention contemplates the utilization of one of the seats of the vehicle body, preferably, and advantageously, the driver's seat as the element to be actuated to work the pump or pumps for compressing air. To this end, one of the vehicle body seats as designated at 5 is mounted on and securely fastened to a shaft 6, trunnioned or otherwise mounted at its ends so as to constitute a support for the seat 5 and permit of the seat being rocked back and forth by a person sitting therein or by grasping the seat by the hands. Depending from this shaft 6, is a crank or arm 7, to the lower end of which is pivotally-connected the outer ends of a pair of oppositely-extending piston rods 8. The pistons 9 which carry these rods extend into and work in cylinders 10, pivotally-supported at their outer ends as at 11 from brackets 12 mounted on a suitable support 14. Any suitable type of cylinder and piston may be used, that is, the pistons may be provided with flap-valves as 15 for the admission of air on the out-stroke of the pistons, or the cylinders may be provided with suitable intake valves.

At their outer ends, the cylinders are each provided with an air outlet port, in which is a nipple 16; the nipples of the respective cylinders receive one end of flexible connections 17, the other ends of which are connected with branch-conductors 19 leading to a main conducting pipe or tube 20, which is in communication with the storage tank or reservoir 21. This tank or reservoir is made from inflatable material, as rubber or a composition rubber and canvas, and is connected by a pipe or tube 22 with the cushioning elements 23 on the front and rear axles 24, 25, respectively of the vehicle. Where a single element is employed on the front axle, and a pair of such elements on the rear axle as herein shown, the pipe 22 may be led directly to the cushioning element on the front axle 24, and by a branched-pipe or tube 26 leading from the pipe 22, to the cushioning elements on the rear axle 25. The cushioning elements 23 are not herein shown in detail, being made the subject-matter of a separate application; they are of a pneumatic nature, and the pipe or tube connections therewith are of course of such nature that air may be forced into the cushioning elements and held against backflow, as by flap valves, or other approved means.

The storage tank or reservoir being made in the nature of an inflatable bag, means is provided for collapsing this bag as the pressure of air in the cushioning elements decreases, and as herein shown, this means comprises two curved presser-plates 27, which lie on opposite sides of the bag and each having a centrally disposed rib 28 on the outer face, these ribs extending beyond the respective ends of the plates, and pivotally-connected at one end to a clamp 29 on the pipe 20. At their other ends, these ribs are pivotally-connected, the upper one to a weighted arm 30, and the lower one to a link 31, the other end of said link being pivotally-connected to the inner end of the weighted arm 30.

That the seat 5 may be held in fixed position when it is not being rocked to work the pumps, a suitable catch 32 is provided, which may be of any desired form and located at any desirable point.

When it is desired to charge the cushioning elements and the storage tank or reservoir, the operator, sitting on the seat 5, releases catch 32, and rocks the seat back and forth to effect compression of air in the cylinders alternately, one cylinder taking in air while air is being compressed in the other cylinder. The compressed air is conducted through branch pipes 19 and main pipe 20 to the inflatable bag 21, and from thence to the cushioning elements 23. When the cushioning elements become inflated, the bag 21 begins to inflate or distend, spreading the presser-plates 27, until such time as the bag 21 is fully inflated, when the operator again locks the seat 5, leaving both the cushioning elements and the bag 21 fully inflated. As the air decreases in the cushioning elements the presser-plates tend to depress the collapsible bag 21, forcing the air therein into the pipe 22 and into the cushioning elements, so as to maintain a maximum inflation of said elements for a maximum period of time without necessitating frequent recharging by operation of the pumps. It will be observed that I have provided a novel and effective means whereby the cushioning elements may thus be maintained fully charged with compressed air, the charging being accomplished manually, without the operator being required to leave his seat for operation of the pumps.

In the use herein of the term "rocking means," I desire to be understood thereby as meaning a device in which the rocking element is actuated by a person seated thereon, the weight of the person upon the element very materially increasing the amount of leverage which may be obtained for the operation of the pumping device. The said term therefore as used by me is to be distinguished from a device such as a lever which is merely grasped by the hands, or worked by the foot of the operator, as in such devices the applied weight of the operator is of course wholly absent.

While a working embodiment of the invention is herein shown and described in detail, yet it will be evident that as existing conditions may require, various changes may be made in the details such as the manner of connecting the cylinders with the cushioning elements and the like, without departing from the general spirit of the invention and the scope of same as claimed.

Having fully described my invention, what I claim is:—

1. In combination, a pair of compressors, each having its piston rod projecting therefrom, an oscillatory arm connected to the outer ends of said piston rods, a rock shaft for operating said arm, and a seat connected to the rock shaft and adapted to be rocked by a person, thereby actuating the rock shaft.

2. In combination, a pair of compressors, each having its piston rod projecting therefrom, an oscillatory arm connected to the outer ends of said piston rods, a rock shaft for operating said arm, a seat connected to the rock shaft and adapted to be rocked by a person, thereby actuating the rock shaft, compressible air storage means communicating with said compressors, and means for automatically compressing said storage means, thereby expelling the air therefrom.

3. In combination, a pair of compressors, each having its piston rod projecting therefrom, an oscillatory arm connected to the outer ends of said piston rods, a rock shaft for operating said arm, a seat connected to the rock shaft and adapted to be rocked by a person, thereby actuating the rock shaft, compressible air storage means communicating with said compressors, and means for automatically compressing said storage means, thereby expelling the air therefrom, and cushioning elements communicating with said compressible air storage means.

In testimony whereof I affix my signature in presence of two witnesses.

MICHAEL G. McGUIRE.

Witnesses:
R. M. PARKER,
A. M. WILSON.

Copies of this patent may be obtained for five cents each, by addressing the "Commissioner of Patents, Washington, D. C."